Sept. 23, 1969  C. P. BAUM  3,468,501
COMPATIBLE MISSILE/AIRCRAFT CONFIGURATION
Filed Aug. 29, 1967  2 Sheets-Sheet 1

INVENTOR
C. PHILEMON BAUM

BY

ATTORNEY

AGENT

United States Patent Office 3,468,501
Patented Sept. 23, 1969

3,468,501
COMPATIBLE MISSILE/AIRCRAFT
CONFIGURATION
Cleophas Philemon Baum, Bethesda, Md., assignor to the United States of America as represented by the Secretary of the Navy
Filed Aug. 29, 1967, Ser. No. 664,215
Int. Cl. B64d 7/00; F42b 19/46, 22/44
U.S. Cl. 244—137                    2 Claims

ABSTRACT OF THE DISCLOSURE

A configuration to improve the aerodynamic and structural efficiency of stores such as missiles, fuel tanks, etc., which are appended externally on high performance aircraft. By making the stores triangular in cross section, with a pointed nose and tail fins, and attaching them closely to an airframe, not only is air turbulence and drag reduced, but an added uplift is given to the aircraft by the action of the wedge shaped stores in causing an air compression area under the wing.

BACKGROUND OF THE INVENTION

The present invention relates to missiles and aircraft configurations and more particularly to missiles and aircraft configurations which are shaped to improve the aerodynamic and structural efficiency of high performance aircraft.

In the past virtually all missiles, fuel tanks and externally appended stores have been made circular in cross section with some attempt to streamline their configuration. In some cases highly efficient aerodynamic configurations have been achieved for the store itself. However, the stores created serious interference effects on high performance aircraft wings and fuselages unless suspended at some appreciable distance from these bodies. The racks and pylons used for suspension and release of these stores create aerodynamic turbulence and therefore drag; also pylons of high slenderness ratios are structurally inefficient for resisting side loads and may generate unknown problems because of flexure under load. In an attempt to overcome these disadvantages it was frequently common to use clusters of smaller or medium size bombs, or numbers of such external clusters arranged in tandem fashion. However, the net result of these unsatisfactory arrangements is that which was intended to be a high performance attack airplane became an inefficient airplane with mediocre performance when loaded for missions for which the airplane was intended. Airplanes often are produced competitively, based on performance of the "clean" rather than "dirty" or loaded configuration. As a generalization, these stores and their supports exact an unnecessary penalty on the aspiration of the aircraft primarily because the assembly of the stores is not designed to be supported in intimate proximity to the aircraft body, nor is it designed to complement the airplane's aerodynamic characteristics.

SUMMARY OF THE INVENTION

The present invention overcomes these enumerated disadvantages by providing a configuration for appended stores which is not only streamlined and stable in its design, but one which is located in close proximity to the airframe of the aircraft so as to complement its aerodynamic performance.

An object of the present invention is the provision of a compatible store/aircraft configuration.

Another object is the provision of an appended store which is streamlined in configuration and minimizes aerodynamic turbulence.

Another object is the provision of an appended store which is located in intimate proximity to the aircraft body.

Still another object is the provision of an appended store which complements the aircraft's aerodynamic performance.

Yet another object is the provision of an appended store which requires no side bracing to prevent side sway.

Still another object is the provision of an appended store which improves the operating efficiency of high performance aircraft.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

DESCRIPTION OF PREFERRED EMBODIMENTS

Figure 1:
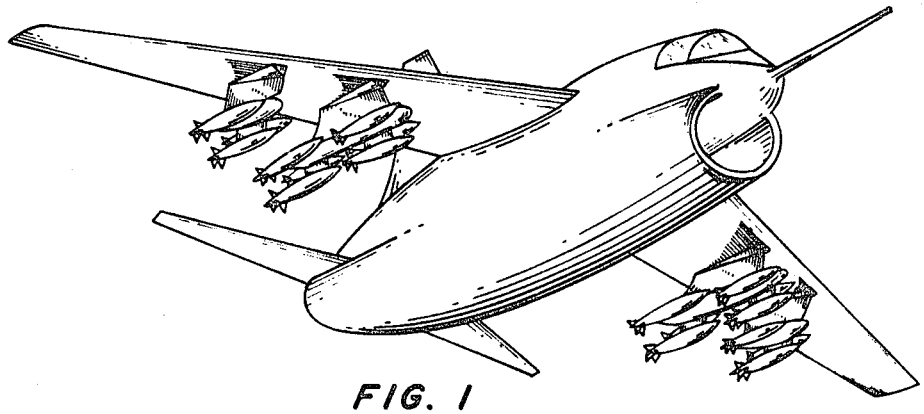
FIG. 1 shows a prior art airplane with stores suspended from the underside of the wing.

Referring now to the drawings, there is seen in FIG. 1 a prior art conventional aircraft having stores in the form of missiles suspended from the lower side of its wings. It can be seen also that these missiles are circular in shape and are suspended at some appreciable distance from the wing itself by means of racks or vertical braces. Furthermore, from this view, it can be appreciated that while the missiles are streamlined to some extent, there is nevertheless a certain amount of aerodynamic inefficiency present which creates turbulence and drag in the slip stream.

Figure 2:
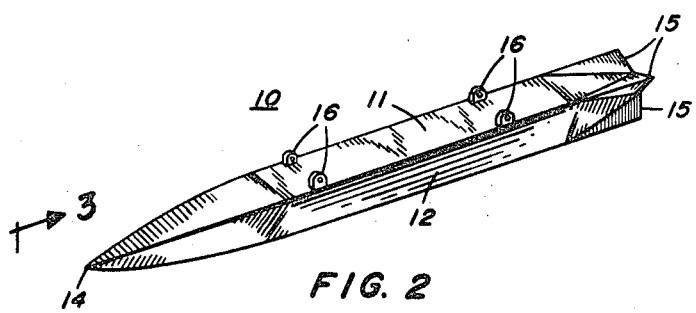
FIG. 2 shows the configuration of a triangular store.
Figure 3:
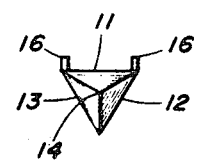
FIG. 3 shows a cross-sectional view taken along the line 3—3 of FIG. 2.

In FIGS. 2 and 3 there is shown an elongated triangular shaped store shown generally as numeral 10, the store being made up of three sides, 11, 12 and 13, fastened together to make the cross-sections shown in FIG. 3. The front of the three sides 11, 12 and 13 are tapered down toward a point, as at 14, while the aft end of these sides are extended to form integral fins 15. The store 10 may be made of aluminum, or high strength reinforced plastic and of whatever length and cross-section as may be deemed necessary to accomplish its desired purpose. Positioned along the length of top side 11 of the store 10 are several small retractable protuberances 16 which are used to mount the store on the wing of the airplane. The protuberances 16 are designed to extend up into, or down from, a wing or fuselage of the airplane where they form a part of some quick disconnect device for dropping the store when desired.

Figure 4:
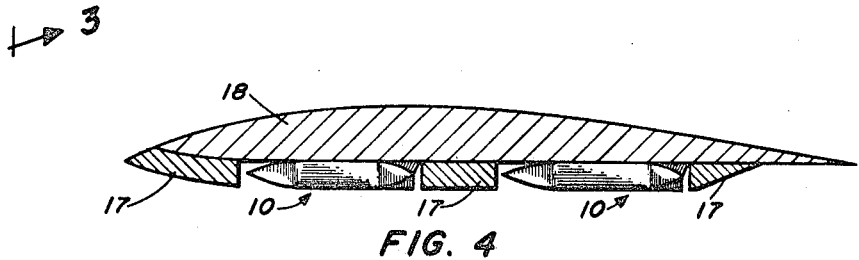
FIG. 4 shows the use of expendable fairings along the underside of the wing.
Figure 5:
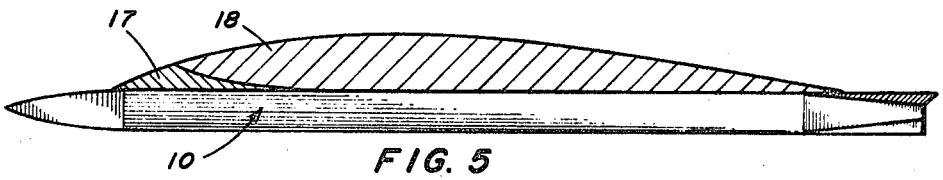
FIG. 5 shows a long triangular store in close promixity to the aircraft wing.
Figure 6:
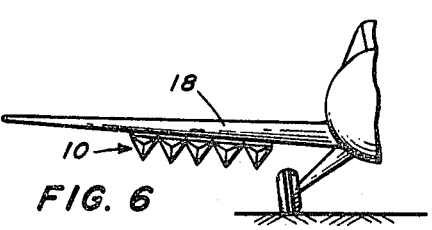
FIG. 6 shows a front view of the stores located on the underside of the wing.
Figure 8:
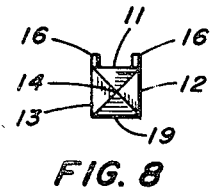
FIG. 8 shows a front view of a conventional airplane with square stores located under the wings.
Figure 7:
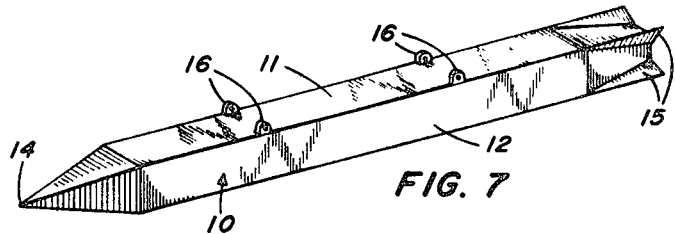
FIG. 7 shows the configuration of a square shaped store.

It is important that the stores 10 be mounted in close proximity to the under side of the aircraft wing and several illustrations of this are shown in FIGS. 4, 5 and 6.

In FIG. 4 stores 10 are mounted in tandem fashion, one behind the other on the under side of the wing with expendable fairings 17 located between the stores to increase the aerodynamic efficiency. In FIG. 6 an array of the stores are shown mounted on the lower surface of the wing and presenting a corrugated surface effect. This form of mounting not only reduces air turbulence and drag, but it can give added lift to the craft. Air passing along the triangular shaped areas is directed up towards the wing itself producing an area of added air pressure as the air is compressed against the wing and in this way added lift is accomplished.

Figure 9:
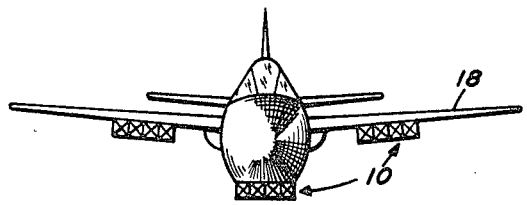
FIG. 9 shows a front view of a twin boom aircraft with square stores located under its wings.

Turning now to FIGS. 7 and 8, 9 and 10, there is shown another embodiment of the invention wherein the store 10 is rectangular in cross-section and is made up of sides 11, 12, 13 and 19. Here, as before, the front of the store is tapered down toward a point as at 14 and its aft end is shaped into integral fins 15. The square stores of this embodiment are grouped together in arrays and fastened in close proximity to the aircraft wing 18 as shown in FIG. 9 as has been done in the previous embodiment. In view of FIG. 10, the square stores are grouped close to the air frame of a twin boom aircraft.

From the above description of the structure and design of the present invention, it is clear that the overall principle involved in the device is to develop airplane store configurations of high compatibility so as to vastly improve the efficiency of a loaded airplane. This is achieved by replacing the traditional circular cross-section of a store with one of triangular shape. An inherently stable triangular shape with a pointed nose and tail fins extending to the limits of the apex of the triangles, as shown in FIG. 2, permits suspending the store in intimate contact with the lower surface of the wing or along a properly shaped fuselage. An array of such stores will present a corregated effect on the lower surface of the wing, such as shown in FIG. 6, the array being disposed favorably with the slip stream of the wing. An increase in the weight of the store can be expected, but appreciable weight saving can be realized by eliminating the external pylon and the need for sway bracing. Tandem arrays of triangular shapes can be accommodated with low drag, expendable fairings between the fore and aft arrays, and any gaps between the store and wing can be closed similarly with these fairings. All suspension and release mechanisms are housed within the wing, either forward or aft of the wing box, or within the fuselage itself. The overall improvement in performance is realized from both lowered drag and lowered installed weight because of superior structural efficiency. The key to the improvement is the use of a triangular cross-sectional shape, affording a stable attaching base, instead of the traditional circular shape requiring a pylon and sway bracing. The availability of moluble high strength reinforced plastics makes this approach readily feasible.

Figure 10:
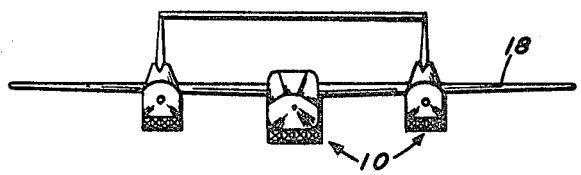

A modification or an alternative way of obtaining some improvements may be achieved with stores of square cross-sectional shapes. Such a configuration lends itself more readily to carriage on a fuselage designed especially as a stores carrier. In this case, performance of the airplane as a stores carrier is of paramount concern as opposed to an unrealistic selection of attack airplanes on the basis of "clean" performance only. With this airplane and store configuration, as illustrated in FIGS. 9 and 10, the stores are carried externally, clustered together on the underside of the flat bottom fuselage. The stores of inherently stable, square cross-section, are pointed at the nose and tail with diagonal tail fins extending only to the limit of the square shape. Expendable fairing pieces at the nose of the store and between tiers arranged in tandem are employed to minimize drag. The key to this improved arrangement is the unconventional square cross-section of the store, a deliberate effort to design an airplane for its "dirty" configuration, that is, as a carrier, and the absence of sway braces and pylons.

From the above description it is clear that the present invention offers considerable improvement in compatable store/aircraft configurations. Through its use, missiles, fuels tanks, etc., may be externally appended to high performance aircraft and by the elimination of support pylons and sway braces aerodynamic turbulence and air drag are materially reduced thereby substantially increasing the efficiency of the aircraft. These improvements when taken into account along with potentially increased lift due to the increased pressure area beneath the wing of the aircraft results in an effective and highly desirable invention.

Obviously many modifications and variations of the present invention are possible in the light of the above teachings.

What is claimed is:

1. An aircraft store configuration for attachment to the airframe of an aircraft comprising:
   a plurality of elongated sheets to form an aircraft store which is triangular in cross-section;
   tapering edges at the forward end of the sheets so that a point is formed when the sheets are joined together;
   nontapering edges at the aft end of the sheets so that fins are formed when the sheets are joined together; and
   fastening means positioned along both edges of one sheet to hold the store in intimate proximity with the airframe of the aircraft, the fastening means comprising short proturburances extending above the triangular-shaped store for insertion into the body of the airframe and for cooperation with a release mechanism, the fastening means holding one face of the triangular-shaped store horizontal with the other two faces pointing downward, whereby the airstream passing under the wing is forced upward by the triangular store thereby decreasing the aerodynamic turbulence and increasing the airlift of the airframe.

2. The device of claim 1 further including a plurality of expendable fairings positioned before, between and behind the stores to further increase the aerodynamic efficiency of the aircraft.

References Cited

UNITED STATES PATENTS

| | | | |
|---|---|---|---|
| 879,079 | 2/1908 | Bon | 244—3.1 |
| 2,530,454 | 11/1950 | Fieser et al. | 102—7 |
| 3,268,188 | 8/1966 | Roe et al. | 244—118 |
| 3,380,691 | 4/1968 | McComas | 244—135 |

MILTON BUCHLER, Primary Examiner

T. W. BUCKMAN, Assistant Examiner